United States Patent
Dwarakanath et al.

(10) Patent No.: US 10,339,036 B2
(45) Date of Patent: Jul. 2, 2019

(54) TEST AUTOMATION USING MULTIPLE PROGRAMMING LANGUAGES

(71) Applicant: Accenture Global Solutions Limited, Dublin (IE)

(72) Inventors: Anurag Dwarakanath, Bangalore (IN); Dipin Era, Thalassery (IN); Subani Basha Nure, Bangalore (IN); Neville Dubash, Mumbai (IN); Sanjay Podder, Thane (IN); Aditya Priyadarshi, Boston, MA (US); Bargav Jayaraman, Hosur (IN)

(73) Assignee: Accenture Global Solutions Limited, Dublin (IE)

( * ) Notice: Subject to any disclaimer, the term of this patent is extended or adjusted under 35 U.S.C. 154(b) by 197 days.

(21) Appl. No.: 15/395,436

(22) Filed: Dec. 30, 2016

(65) Prior Publication Data
US 2018/0189168 A1 Jul. 5, 2018

(51) Int. Cl.
*G06F 11/00* (2006.01)
*G06F 11/36* (2006.01)

(52) U.S. Cl.
CPC .................. *G06F 11/3684* (2013.01)

(58) Field of Classification Search
CPC ............. G06F 11/0706; G06F 11/0718; G06F 11/3612; G06F 11/3636; G06F 11/366; G06F 11/3688; G06F 11/3672
USPC ........................................................ 714/38.1
See application file for complete search history.

(56) References Cited

U.S. PATENT DOCUMENTS

| | | | | |
|---|---|---|---|---|
| 2003/0097602 A1* | 5/2003 | Bigbee | ................ | G06F 9/30003 713/500 |
| 2004/0153855 A1* | 8/2004 | Titmuss | ................ | H04L 41/065 714/43 |
| 2005/0235263 A1* | 10/2005 | Bundy | .................. | G06F 11/263 717/124 |
| 2010/0257505 A1* | 10/2010 | Hinchey | .................. | G06F 8/10 717/101 |
| 2015/0039941 A1* | 2/2015 | Kalyanasundram | ........................ | G06F 11/3688 714/38.1 |

(Continued)

OTHER PUBLICATIONS

Wikipedia, "Programming language," https://en.wikipedia.org/wiki/Programming_language, Dec. 7, 2016, 17 pages.
(Continued)

*Primary Examiner* — Sarai E Butler
(74) *Attorney, Agent, or Firm* — Harrity & Harrity, LLP

(57) ABSTRACT

A device may receive information identifying a first set of instructions. The first set of instructions may identify an action to perform to test a first program. The device may identify a second set of instructions, related to testing a second program, that can be used in association with the first set of instructions. The first test may be similar to the second test. The device may identify multiple steps, of the first set of instructions, that can be combined to form a third set of instructions. The third set of instructions may be used to test the first program or a third program. The device may generate program code in a first programming language to perform the action. The first programming language may be different than a second programming language used to write the first set of instructions. The device may perform the action.

20 Claims, 8 Drawing Sheets

(56) References Cited

U.S. PATENT DOCUMENTS

| | | | | |
|---|---|---|---|---|
| 2015/0089289 | A1* | 3/2015 | Gahoi | G06F 11/27 714/30 |
| 2015/0127985 | A1* | 5/2015 | Onoue | G06F 3/0611 714/33 |
| 2015/0286556 | A1* | 10/2015 | Ellis | G06F 11/3684 717/125 |
| 2015/0331788 | A9* | 11/2015 | Wei | H04L 67/02 714/38.1 |
| 2016/0217186 | A1* | 7/2016 | Agarwal | G06F 17/30542 |
| 2017/0091270 | A1* | 3/2017 | Guo | G06K 9/00456 |
| 2017/0108546 | A1* | 4/2017 | Gutierrez | G01R 31/2855 |
| 2017/0161180 | A1* | 6/2017 | Raghavan | G06F 11/3684 |

OTHER PUBLICATIONS

Wikipedia, "Cosine similarity," https://en.wikipedia.org/wiki/Cosine_similarity, Oct. 26, 2016, 5 pages.

Wikipedia, "Test automation," https://en.wikipedia.org/wiki/Test_automation, Dec. 1, 2016, 7 pages.

ConformIQ, "Master Agile Testing and In-sprint automation," www.conformiq.com, Nov. 11, 2016, 4 pages.

Smartesting Solutions & Services, "Certifyit," www.smartesting.com/en/certifyit/, Jan. 23, 2015, 2 pages.

Hewlett Packard Enterprise, "Unified Functional Testing (UFT)," http://www8.hp.com/in/en/software-solutions/unified-functional-automated-testing/, Jan. 6, 2015, 8 pages.

IBM, "Rational Functional Tester," http://www-03.ibm.com/software/products/en/functional, Jun. 14, 2011, 2 pages.

Choudhary et al., "WATER: Web Application Test Repair," http://www.cc.gatech.edu/~shauvik/pubs/roychoudhary11etse.pdf, Jul. 17, 2011, 6 pages.

Dwarakanath et al., "Minimum Number of Test Paths for Prime Path and other Structural Coverage Criteria," https://www.researchgate.net/profile/Anurag_Dwarakanath/publication/279200921_Minimum_Number_of_Test_Paths_for_Prime_Path_and_Other_Structural_Coverage_Criteria/links/558f97b008ae1e1f9baceede.pdf?origin=publication_list, Sep. 23, 2014, 16 pages.

Thummalapenta et al., "Automating Test Automation," http://www.seas.upenn.edu/~nimits/papers/icse12.pdf, Jun. 2, 2012, 11 pages.

Yeh et al., "Sikuli: Using GUI Screenshots for Search and Automation," https://dspace.mit.edu/openaccess-disseminate/1721.1/72686, Oct. 4, 2016, 10 pages.

Selenium Project, "Selenium-IDE," http://www.seleniumhq.org/docs/02_selenium_ide.jsp, Dec. 19, 2016, 20 pages.

Selenium Project, "Selenium WebDriver," http://www.seleniumhq.org/projects/webdriver/, May 11, 2013, 1 page.

Yandrapally et al., "Robust Test Automation Using Contextual Clues," https://domino.research.ibm.com/library/cyberdig.nsf/papers/47BFE6E9CE02A9AA85257CA60038DCC0/$File/IBMResearchReportRl14005.pdf, Feb. 21, 2014, 19 pages.

Dwarakanath et al., "Litmus: Generation of Test Cases from Functional Requirements in Natural Language," In International Conference on Application of Natural Language to Information Systems, pp. 58-69. Springer Berlin Heidelberg, 2012.

* cited by examiner

TEST AUTOMATION USING MULTIPLE PROGRAMMING LANGUAGES

BACKGROUND

A test script is a set of instructions that will be performed to test whether a system (e.g., a computer system or software application) functions as expected. For example, a test script may be a software program written in a programming language. A programming language is a formal computer language or constructed language designed to communicate instructions to a machine, such as a computer. There are numerous different programming languages, such as C++ and Java.

SUMMARY

According to some possible implementations, a device may include one or more processors to receive information identifying a set of steps to perform. The set of steps may be related to a test of a program. One or more steps, of the set of steps, may be written in a first programming language. The one or more processors may determine whether the set of steps is associated with a first artifact that is similar to a second artifact associated with another set of steps based on the information identifying the set of steps. The first artifact may identify information related to the test of the program and the second artifact may identify information related to another test of another program. The one or more processors may determine whether two or more steps, of the set of steps, can be combined into a combined set of steps based on determining whether the set of steps is associated with the first artifact that is similar to the second artifact. The one or more processors may identify program code written in a second programming language based on determining whether the two or more steps, of the set of steps, can be combined into the combined set of steps. The one or more processors may perform an action related to the test of the program based on identifying the program code.

According to some possible implementations, a method may include receiving, by a device, information identifying a first set of instructions. The first set of instructions may identify one or more actions to perform to test a first program. The method may include identifying, by the device, a second set of instructions that can be used in association with the first set of instructions based on information related to a first test of the first program and information related to a second test of a second program. The second set of instructions may be related to testing the second program. The first test may be similar to the second test. The method may include identifying, by the device, multiple steps, of the first set of instructions, that can be combined to form a third set of instructions based on identifying the second set of instructions that can be used in association with the first set of instructions. The third set of instructions are to be used to test the first program or to test a third program. The method may include generating, by the device, program code in a first programming language to perform the one or more actions based on identifying the multiple steps of the first set of instructions that can be combined to form the third set of instructions. The first programming language may be different than a second programming language used to write the first set of instructions. The method may include performing, by the device, the one or more actions based on generating the program code.

According to some possible implementations, a non-transitory computer-readable medium may store one or more instructions that, when executed by one or more processors, cause the one or more processors to receive information identifying a test script. The test script may include one or more steps related to a test of a program. The one or more steps may be written in a first programming language. The one or more instructions, when executed by the one or more processors, may cause the one or more processors to determine whether the test script and another test script are associated with similar artifacts based on receiving the information identifying the test script. The similar artifacts may include information associated with different tests of different programs. The one or more instructions, when executed by the one or more processors, may cause the one or more processors to determine whether a plurality of steps, of the one or more steps, can be combined into a set of steps based on determining whether the test script and the other test script are associated with the similar artifacts. The one or more instructions, when executed by the one or more processors, may cause the one or more processors to identify program code written in a second programming language based on determining whether the plurality of steps of the one or more steps can be combined into the set of steps. The first programming language and the second programming language may be different. The one or more instructions, when executed by the one or more processors, may cause the one or more processors to perform an action related to the test script based on identifying the program code.

DETAILED DESCRIPTION

The following detailed description of example implementations refers to the accompanying drawings. The same reference numbers in different drawings may identify the same or similar elements.

A test script may be used to test functionality of a program, an application, or a device. In such a case, the creation and maintenance of the test script may require significant technical skill. For example, a test script may have to be programmed using program code. In addition, different test scripts that test different functionality may have to be written in different programming languages.

Implementations described herein provide a test automation platform that may receive a test script in a first programming language and generate and/or identify program code in a second programming language (e.g., to be used to execute the test script or a portion of the test script). Additionally, the test automation platform may identify test scripts that are similar to a received test script. Further, the test automation platform may identify steps of various test scripts that may be combined into a single test script.

In this way, the test automation platform reduces an amount of technical skill needed to create test scripts by reducing a quantity of programming languages that a tester may have to know. Additionally, the test automation platform reduces repetitious creation of test scripts, thereby increasing the efficiency of creating test scripts. Further, the test automation platform conserves processing resources by reducing an amount of programming code that the test automation platform and/or another device compiles/executes. Still further, the test automation platform conserves memory resources by reducing a quantity of lines of code that the test automation platform and/or another device stores. Additionally, the test automation platform may reduce an amount of code required to be written by a tester.

Figure 1A:
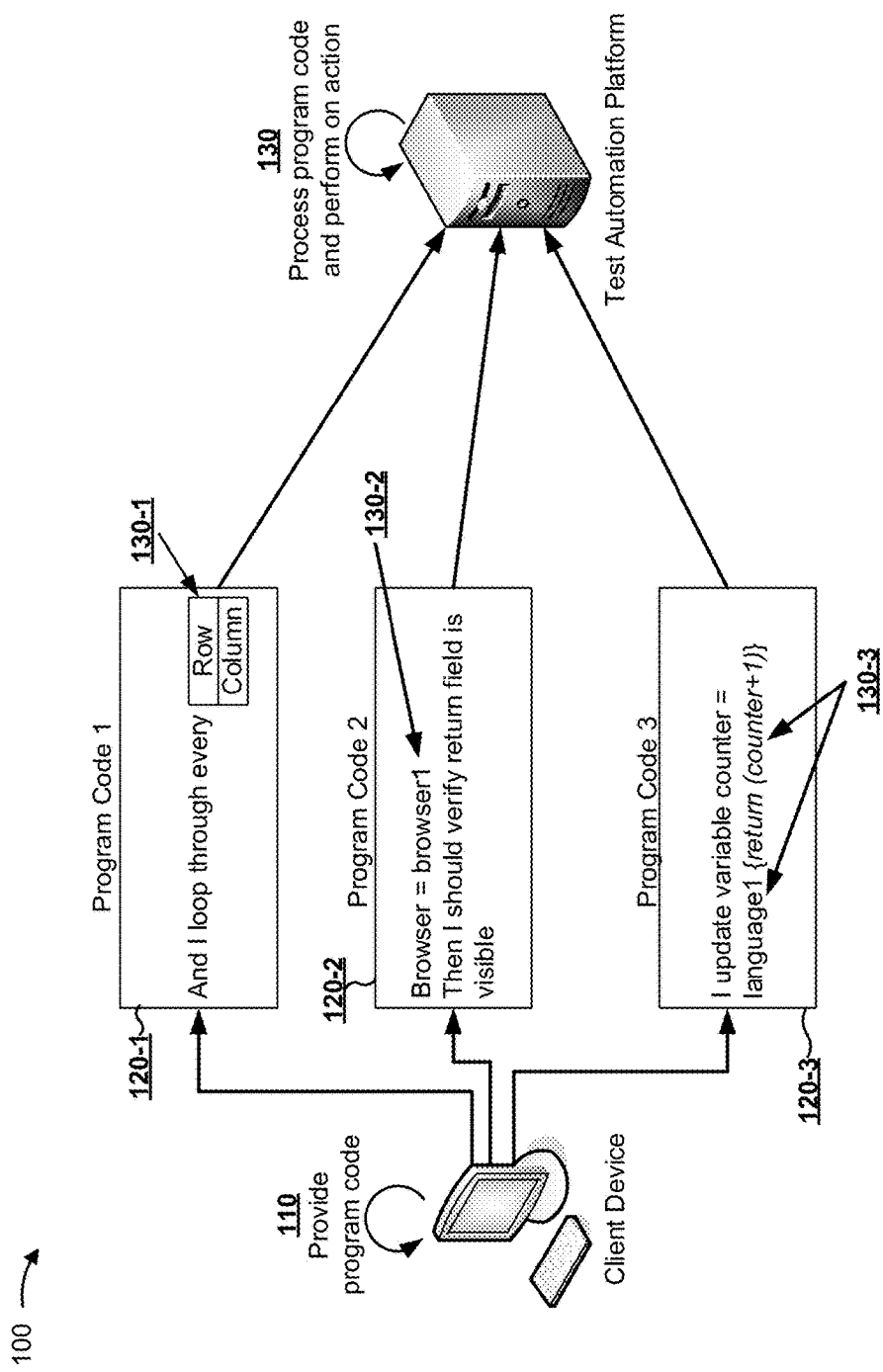
FIGS. 1A and 1B are diagrams of an overview of an example implementation described herein.
Figure 1B:
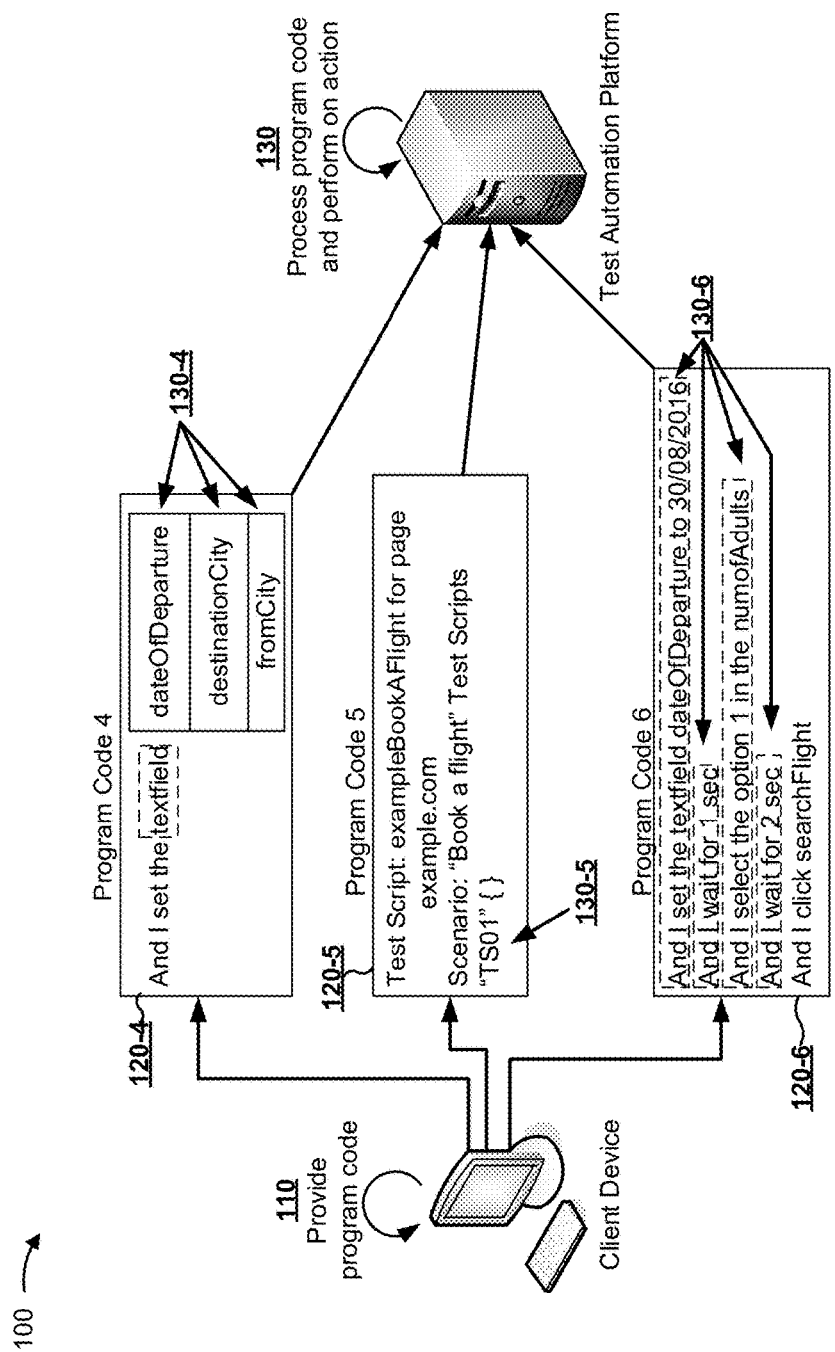

FIGS. 1A and 1B are diagrams of an overview of an example implementation 100 described herein. FIGS. 1A and 1B show six features of a test automation platform related to processing program code. As described herein, reference numbers 110, 120-1, and 130-1 relate to a first feature of the test automation platform, reference numbers 110, 120-2, and 130-2 relate to a second feature, and so forth. As shown in FIG. 1A, example implementation 100 may include a client device and a test automation platform.

As shown by reference number 110, the client device may provide program code to the test automation platform. As shown by reference numbers 120-1 through 120-3 (and 120-4 through 120-6 in FIG. 1B), the client device may provide program code to the test automation platform, as described in more detail below. For example, the test automation platform may receive program code written in an English-like domain-specific language (e.g., a domain specific language with a syntax similar to English, such as a subject-verb-object syntax) that is mapped to another programming language, such as Java. As shown by reference number 130, the test automation platform may process the program code, and may perform an action, as will be described further below with respect to reference numbers 130-1 through 130-3 (and 130-4 through 130-6 for FIG. 1B).

In some implementations, the program code may be handwritten by a user of the client device. Additionally, or alternatively, the program code may be included in a program file. In some implementations, the program code may include thousands or millions of lines of program code, and/or may relate to thousands or millions of test scripts which may test thousands or millions of devices, applications, programs, and/or the like. In some implementations, the program code may be in a first programming language (e.g., a natural language programming language).

As shown by reference number 120-1, the program code may include a particular term or phrase, such as a line or phrase typed by a user of the client device (e.g., And I loop through every). As shown by reference number 130-1, the test automation platform may identify portions of program code in a second programming language (e.g., Java) associated with the identified term or phrase, and may provide various options for the user to select based on the identified term or phrase. For example, the test automation platform may identify the term loop in the program code received from the client device and determine that the program code is to be used to loop through data. Continuing with the previous example, the test automation platform may display options for different types of loops (e.g., "Row" for a loop through rows of data and "Column" for a loop through columns of data), from which a user of the client device may select, based on identifying the term loop in the program code.

In some implementations, the test automation platform may generate program code in a second programming language based on the user selection. For example, if a user of the client device selects "Row," the test automation platform may generate program code in the second programming language to loop through rows of data. As another example, if a user of the client device selects "Column," the test automation platform may generate program code in the second programming language to loop through columns of data.

In this way, the test automation platform may dynamically identify program code in a first programming language and generate one or more portions of program code in a second programming language. In addition, the test automation platform may use a high-level template (e.g., a program code template associated with the term loop) that maps to multiple low-level actions or commands in the second programming language (e.g., commands related to looping through rows and/or columns).

As shown by reference number 120-2, the program code in a first programming language may include information identifying a particular browser (e.g., a web browser) to be used by the program code (e.g., shown as browser1). In some cases, program code may have to be in a particular language to use the particular browser (e.g., a second programming language different than the first programming language). As shown by reference number 130-2, the test automation platform may generate program code in a second programming language (e.g., in a programming language used by the browser) based on the browser identified in the program code in the first programming language. In some implementations, the generated program code may cause the same actions or result as the received program code in the first programming language.

In this way, the test automation platform may receive program code in a first programming language and dynamically generate program code in a second programming language based on a browser or software associated with the program code in the first programming language. This reduces an amount of technical skill needed by a tester by reducing or eliminating the need for the tester to know multiple programming languages. In addition, the test automation platform may generate program code based on specific aspects, or idiosyncrasies, of a browser or other program used to test software and/or device.

As shown by reference number 120-3, the program code may include program code in different programming languages (e.g., as shown by italic and non-italic text). As shown by reference number 130-3, the test automation platform may identify a first portion of the program code in a first programming language (e.g., return (counter+1)) based on an identifier (e.g., language1) in a second portion of the program code in a second programming language that identifies the first programming language. The test automation platform may execute the program code shown by reference number 120-3 despite the program code including portions of program code in different programming languages. In this way, the test automation platform may identify and execute program code written in multiple programming languages. In addition, this permits integration of multiple programming languages, thereby improving an efficiency of generating test scripts.

In this way, and as described above with respect to FIG. 1A, a test automation platform may receive program code in a first programming language and may process the program code to dynamically generate program code in a second programming language.

As shown in FIG. 1B, and as further shown by reference number 120-4, the test automation platform may receive program code that identifies a particular type of object (e.g., textfield, which may identify a text field, a text box, and/or the like that receives text). In some cases, a particular action may not be performed on a particular type of object (e.g., due to a pre-defined rule). For example, a text box may not be clickable (e.g., as may be the case with a button). Due to this, a tester may not want program code that identifies a particular type of object to include a reference to an object of a different type.

As shown by reference number 130-4, the test automation platform may identify objects of the particular type and may provide information identifying the objects for display (e.g., to permit a user to select an object of the particular type). For example, the test automation platform may identify text boxes associated with a user interface based on identifying textfield in the program code and may provide information identifying the text boxes for display to permit the user to select a particular text box for the program code to reference. Continuing with the previous example, the test automation platform may not provide options for a type of object different than the type of object identified in the program code (e.g., a button or a dropdown menu).

In this way, the test automation platform may improve generation of program code by reducing or eliminating references to objects that may not be used with the program code. This reduces errors related to the program code, thereby conserving processing resources that would otherwise be used to execute erroneous program code.

As shown by reference number 120-5, the test automation platform may receive program code that identifies a particular test script (e.g., "TS01"). As shown by reference number 130-5, the test automation platform may identify a test artifact (e.g., a document, a description, a diagram, etc. related to development or testing of software) that is the same or similar to the test artifact with which the test script is associated.

For example, the test automation platform may process project requirements, program code, or diagrams related to a first test script and a second test script to identify terms and/or tags. Continuing with the previous example, the test automation platform may determine whether terms and/or tags associated with the first test script and the second test script are similar (e.g., indicating that the test artifacts associated with the first test script and the second test script are similar) and may determine that first test script and the second test script can be used together based on the associated terms and/or tags being similar.

In this way, the test automation platform increases an efficiency of using test scripts by identifying test scripts that are associated with similar test artifacts and can potentially be used in combination to test software and/or a device.

As shown by reference number 120-6, the test automation platform may receive program code that includes various test steps of a test script. As shown by reference number 130-6, the test automation platform may identify test steps that can be combined into a separate, combined test script. For example, the test automation platform may process the test script to identify particular terms or characters that identify a test step, and may determine whether the identified test step is included in a threshold quantity of other test scripts.

Continuing with the previous example, when the test automation platform determines that the test steps are included in a threshold quantity of other test scripts, the test automation platform may generate a separate, combined test script that includes the test steps. The separate, combined test script may be referenced by another test script, thereby reducing or eliminating the need for the other test script to include the test steps of the separate, combined test script. In this way, the test automation platform increases an efficiency of using test scripts by identifying test steps that can be combined into a separate, combined test script for use by another test script. This increases the modularity of the test script and thereby reduces the maintenance effort of the tester.

In this way, and as described above by FIG. 1B, a test automation platform may receive program code in a first programming language and may process the program code to dynamically generate program code in a second programming language. In addition, as further described, the test automation platform may identify test scripts that can be used in combination based on being associated with similar test artifacts, and may identify test steps of a test script that can be combined into a separate, combined test script.

In this way, the test automation platform reduces the amount of technical skill needed to create test scripts by reducing a quantity of programming languages that a tester may have to know. Additionally, or alternatively, the test automation platform reduces repetitious creation of test scripts, thereby increasing an efficiency of creating test scripts. Additionally, or alternatively, the test automation platform conserves processing resources by reducing the amount of programming code that the test automation platform and/or another device compiles/executes. Additionally, or alternatively, the test automation platform conserves memory resources by reducing a quantity of lines of program code that the test automation platform and/or another device stores. Additionally, or alternatively, the test automation platform may reduce an amount of program code required to be written by a tester.

As indicated above, FIGS. 1A and 1B are provided merely as an example. Other examples are possible and may differ from what was described with regard to FIGS. 1A and 1B.

Figure 2:
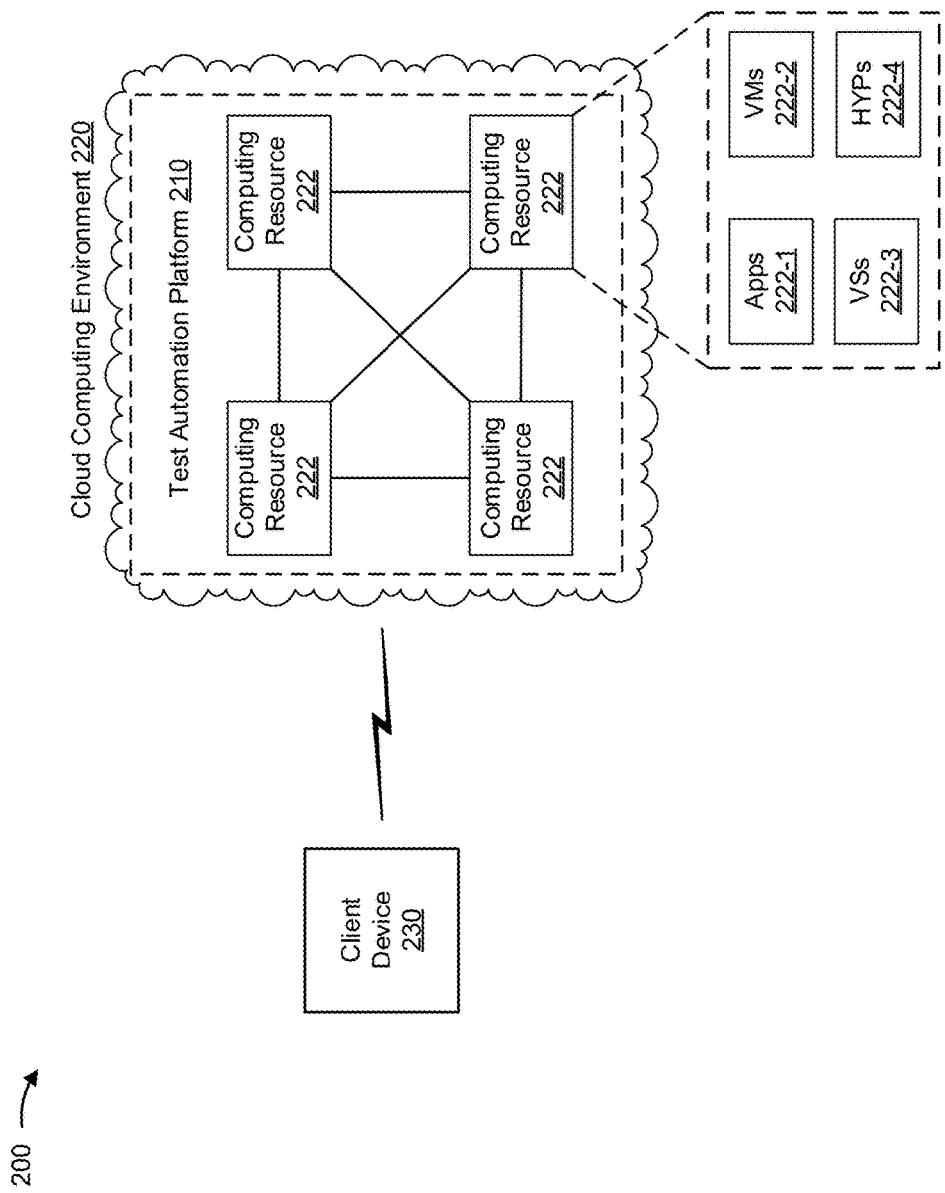
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a test automation platform 210, a cloud computing environment 220, a set of computing resources 222, and a client device 230. Devices of environment 200 may interconnect via wired connections, wireless connections, or a combination of wired and wireless connections.

Test automation platform 210 includes one or more devices capable of processing program code in a programming language and generating or identifying program code in another programming language. For example, test automation platform 210 may include a cloud server or a group of cloud servers. In some implementations, test automation platform 210 may be designed to be modular such that certain software components can be swapped in or out depending on a particular need. As such, test automation platform 210 may be easily and/or quickly reconfigured for different uses.

In some implementations, as shown, test automation platform 210 may be hosted in cloud computing environment 220. Notably, while implementations described herein describe test automation platform 210 as being hosted in cloud computing environment 220, in some implementations, test automation platform 210 may not be cloud-based (i.e., may be implemented outside of a cloud computing environment) or may be partially cloud-based.

Cloud computing environment 220 includes one or more personal computers, workstation computers, server devices, or other types of computation and/or communication devices. In some implementations, computing resource 222 may host test automation platform 210. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

Computing resource 222 includes an environment that hosts test automation platform 210. Cloud computing environment 220 may provide computation, software, data access, storage, etc. services that do not require end-user (e.g., client device 230) knowledge of a physical location and configuration of system(s) and/or device(s) that host test automation platform 210. As shown, cloud computing environment 220 may include a group of computing resources 222 (referred to collectively as "computing resources 222" and individually as "computing resource 222").

As further shown in FIG. 2, computing resource 222 may include a group of cloud resources, such as one or more applications ("APPs") 222-1, one or more virtual machines ("VMs") 222-2, one or more virtualized storages ("VSs") 222-3, or one or more hypervisors ("HYPs") 222-4.

Application 222-1 includes one or more software applications that may be provided to or accessed by one or more devices of environment 200. Application 222-1 may eliminate a need to install and execute the software applications on devices of environment 200. For example, application 222-1 may include software associated with test automation platform 210 and/or any other software capable of being provided via cloud computing environment 220. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., client device 230), and may manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Client device 230 includes one or more devices capable of receiving, generating, storing, processing, and/or providing information associated with program code. For example, client device 230 may include a communication and/or computing device, such as a desktop computer, a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device. In some implementations, client device 230 may provide program code to test automation platform 210, as described elsewhere herein. Additionally, or alternatively, client device 230 may receive information from test automation platform 210 related to other program code, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
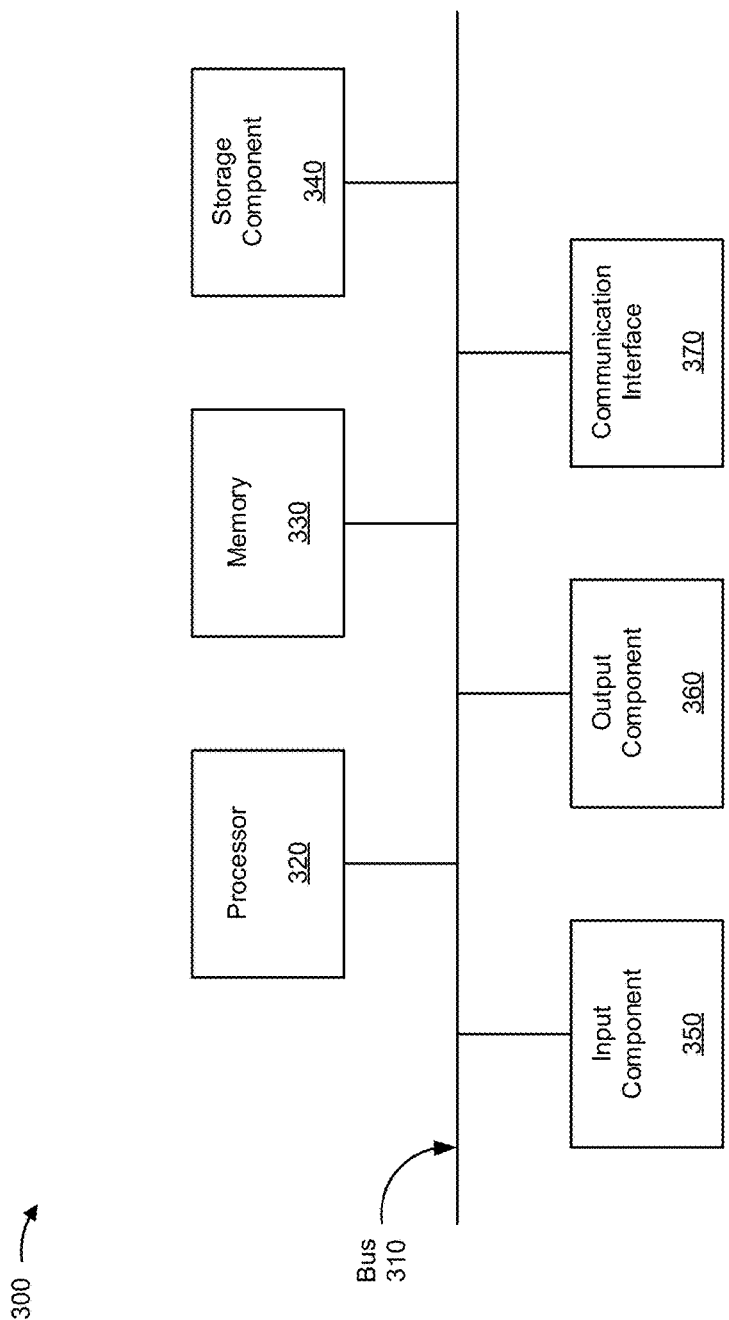
FIG. 3 is a diagram of example components of one or more devices of FIG. 2.

FIG. 3 is a diagram of example components of a device 300. Device 300 may correspond to test automation platform 210, computing resource 222, cloud computing environment 220, and/or client device 230. In some implementations, test automation platform 210, computing resource 222, cloud computing environment 220, and/or client device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
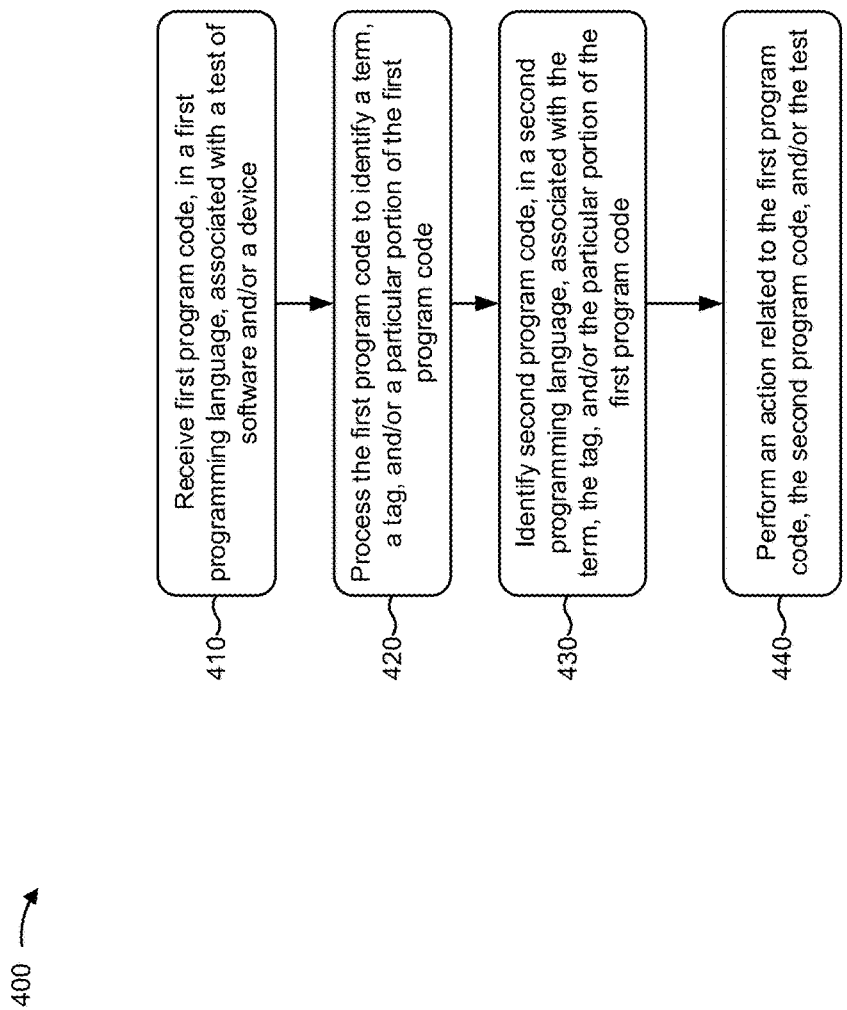
FIG. 4 is a flow chart of an example process for generating program code in a first programming language based on program code in a second programming language.

FIG. 4 is a flow chart of an example process 400 for generating program code in a first programming language based on program code in a second programming language. In some implementations, one or more process blocks of FIG. 4 may be performed by test automation platform 210. In some implementations, one or more process blocks of FIG. 4 may be performed by another device or a group of devices separate from or including test automation platform 210, such as client device 230.

As shown in FIG. 4, process 400 may include receiving first program code, in a first programming language, associated with a test of software and/or a device (block 410). For example, test automation platform 210 may receive first program code in a first programming language.

In some implementations, test automation platform 210 may receive the first program code in a first programming language (e.g., from client device 230). For example, test automation platform 210 may receive the first program code when a user of client device 230 inputs the first program code in a code editor, when test automation platform 210 receives a program file that includes the first program code, and/or the like. In some implementations, test automation platform 210 may receive the first program code periodically, according to a schedule, based on input from a user of client device 230, and/or automatically from another device.

In some implementations, program code may include text-based code that may be executed by a device, by software executing on the device, by software executing remotely, and/or the like. For example, program code may include Java code, C++, or another type of hardware and/or software based code. In some implementations, when test automation platform 210 receives program code, test automation platform 210 may receive thousands, millions, or billions of lines of program code. Additionally, or alternatively, the program code may relate to testing thousands, millions, or billions of software programs, devices, and/or the like.

In some implementations, a programming language may include a computer language or constructed language designed to communicate instructions to a machine (e.g., a computer). For example, the programming language may include Java, C++, Gherkin, a domain-specific language, a natural language programming language that has a natural language syntax (e.g., an English-like syntax, such as a subject-verb-object syntax), and/or the like. In some implementations, use of a natural language programming language may improve testing by reducing an amount of technical skill needed to write and/or maintain program code. In some implementations, the programming language may be used to create software, such as to control the behavior of a machine and/or to express an algorithm.

In some implementations, a first programming language may be mapped to a second programming language. For example, a natural language programming language may be mapped to another programming language, such as Java. In some implementations, the first programming language and the second programming language may be mapped based on program code. For example, a term or a portion of program code of a natural language programming language may be mapped to a term or a portion of Java code (e.g., using a data structure, a set of rules, etc.). This permits quick and efficient identification and/or generation of program code in a programming language based on program code in another programming language, thereby conserving processing resources.

In some implementations, a term or a portion of program code of a first programming language may be mapped to multiple terms or portions of program code of a second programming language. For example, a portion of program code in a natural language programming language may be mapped to multiple terms or portions of Java code. As a particular example, the term loop in a natural language programming language may be mapped to a first portion of Java code that loops through rows of a table and a second portion of Java code that loops through columns of a table. This conserves memory resources by reducing a quantity of portions of a first programming language that test automation platform 210 may have to store.

In this way, test automation platform 210 may receive program code in a first programming language.

As further shown by FIG. 4, process 400 may include processing the first program code to identify a term, a tag, and/or a particular portion of the first program code (block 420). For example, test automation platform 210 may process the first program code to identify a term, a tag, and/or a particular portion of the first program code. In some implementations, test automation platform 210 may process the first program code using natural language processing, text analysis, computational linguistics, machine learning, and/or artificial intelligence to identify a term, a tag, and/or a particular portion of the first program code.

In some implementations, when test automation platform 210 receives the first program code, test automation platform 210 may process the first program code to determine whether a term, a tag, and/or a portion of the first program code is mapped to second program code in another programming language. For example, test automation platform 210 may process the first program code using a data structure that identifies mapped terms, tags, and/or portions of program code. In some implementations, test automation platform 210 may compare a term, a tag, and/or a portion of the first program code and terms, tags, and/or portions of program code stored in a data structure and may determine a mapping when the comparison indicates a match.

In some implementations, when test automation platform 210 receives the first program code, test automation platform 210 may process the first program code to identify an identifier that identifies a particular browser (e.g., a web browser), software program, and/or the like, which is to use, execute, or be controlled by the first program code. In some implementations, different browsers, software programs, and/or the like may use program code in programming languages different from the first programming language. In some implementations, test automation platform 210 may process the first program code to identify second program code in a second programming language based on the identifier in the first program code that identifies the particular browser, software program, and/or the like, as described elsewhere herein.

In some implementations, when test automation platform 210 receives the first program code, test automation platform 210 may process the first program code to identify a term, a tag, and/or a portion of program code that identifies second program code written in a different programming language. For example, test automation platform 210 may process the first program code to identify a portion of the first program code, such as JavaCode{ }, to identify second program code written in Java (e.g., where the { } characters contain the second program code written in Java). In this way, a test script may include program code written in various programming languages, thereby reducing or eliminating a need for a tester to separately write test scripts, or portions thereof, in different programming languages.

In some implementations, test automation platform 210 may store a set of rules. In some implementations, the set of rules may relate to a syntax, format, or structure of a programming language. Additionally, or alternatively, the set of rules may relate to a variable, an object, and/or the like, defined in program code. For example, the set of rules may define a particular object of a web page as a text box that receives or displays text, a button or other control that is clickable, a dropdown menu that includes various selection options, and/or the like.

In some implementations, test automation platform 210 may receive the set of rules (e.g., prior to storing the set of rules). For example, test automation platform 210 may receive the set of rules from a user (e.g., such as when a user defines the set of rules using program code), when test automation platform 210 processes text (e.g., a text document, a text file, a web page, etc.) using natural language processing, text analysis, computational linguistics, machine learning, and/or artificial intelligence to identify the set of rules, and/or the like.

As a specific example, test automation platform 210 may process a document object model (DOM) of a web page to identify various types of objects of the web page, such as a text box, a control, a drop-down menu, or a radio button. In this case, test automation platform 210 may identify a set of rules based on the type of object and/or other information included in text related to the web page (e.g., text included as a comment in program code of the web page). For example, where a text box is identified, test automation platform 210 may determine that a particular object of a web page is a text box and may determine a set of rules that prevent program code from attempting to click the text box (as may be permitted if the object were a control) or performing other actions other than inputting text into the text box.

In some implementations, when test automation platform 210 receives program code, test automation platform 210 may process the program code using a set of rules. For example, test automation platform 210 may parse the program code to identify a term, a tag, or a portion of program code and may determine whether the program code satisfies the set of rules using the term, the tag, and/or the portion of program code.

In some implementations, test automation platform 210 may determine whether a term, a tag, or a portion of program code is associated with a set of rules. For example, test automation platform 210 may use a data structure that includes portions of program code, terms, and/or tags and corresponding sets of rules to determine whether a term, a tag, and/or a portion of program code is associated with a set of rules.

In some implementations, test automation platform 210 may determine whether the program code satisfies a set of rules. For example, test automation platform 210 may receive program code that is associated with a text box of a web page (e.g., to input text into the text box). In this case, test automation platform 210 may determine that the program code, when executed, inputs text into the text box, and does not click the text box (as though the text box were a control) or perform another unpermitted action related to the text box, by identifying a term related to inputting text into a text box, a portion of program code that causes text to be input into a text box, and/or the like.

In some implementations, test automation platform 210 may determine whether program code satisfies the set of rules in real-time or near real-time (e.g., as the program code is being written, prior to compiling or executing the program code, etc.). This increases an efficiency of determining whether the program code satisfies a set of rules, thereby conserving processing resources. In addition, this conserves processing resources that would otherwise be used to compile and/or attempt to execute program code that does not satisfy the set of rules.

In this way, test automation platform 210 improves generation of program code by determining whether the program code satisfies a set of rules, thereby reducing or eliminating errors related to writing the program code. In addition, this reduces or eliminates an amount of technical skill needed to write program code.

In this way, test automation platform 210 may process first program code to identify a term, a tag, and/or a particular portion of the first program code.

As further shown in FIG. 4, process 400 may include identifying second program code, in a second programming language, associated with the term, the tag, and/or the particular portion of the first program code (block 430). For example, test automation platform 210 may identify second program code, in a second programming language, associated with the term, the tag, and/or the particular portion of the first program code.

In some implementations, when test automation platform 210 identifies first program code that is mapped to second program code, test automation platform 210 may identify one or more portions of second program code to which the first program code is mapped. For example, test automation platform 210 may identify one or more portions of Java code that are mapped to the term loop in a natural language programming language, such as one or more portions related to looping through rows of data and/or columns of data. In this way, test automation platform 210 may efficiently and dynamically identify one or more portions of program code in a second programming language.

In some implementations, test automation platform 210 may identify second program code based on determining that a particular browser, software program, and/or the like is identified by the first program code. For example, when test automation platform 210 determines that the first program code is to use a particular browser when executed (e.g., based on an identifier included in the program code), test automation platform 210 may identify second program in a second programming language associated with the browser.

Continuing with the previous example, test automation platform 210 may identify a portion of Java code as the second program code to which the first program code (e.g., in a natural language programming language) is mapped based on the first program code identifying the particular browser. Conversely, for example, if the identifier identified a different browser, test automation platform 210 may identify a portion of C++ program code, rather than Java code, as the second program code.

In this way, test automation platform 210 may dynamically identify program code in various programming languages based on a browser, software program, and/or the like related to testing of a software program using the first program code. This improves an efficiency of testing a software program using various programming languages, thereby conserving processing resources. In addition, this further improves an efficiency of testing a software program by reducing or eliminating an amount of technical skill needed when testing.

In some implementations, when test automation platform 210 determines that the first program code includes program code in multiple programming languages, such as by identifying JavaCode{ } in the first program code, test automation platform 210 may identify the second program code in the second programming language (e.g., by identifying the second program code between the { } characters of Java-Code{ } in the first program code). In this way, a test script may include program code written in various programming languages, thereby reducing or eliminating a need for a tester to separately write test scripts, or portions thereof, when different programming languages are used.

In this way, test automation platform 210 may identify second program code, in a second programming language, associated with the term, the tag, and/or the particular portion of the first program code.

As further shown by FIG. 4, process 400 may include performing an action related to the first program code, the second program code, and/or the test (block 440). For example, test automation platform 210 may perform an action related to the first program code and/or the second program code.

In some implementations, test automation platform 210 may perform an action when test automation platform 210 identifies the second program code. For example, test automation platform 210 may select the second program code, execute the second program code, compile the second program code, include the second program code in a program file, and/or the like. In some implementations, test automation platform 210 may perform a test of a software program and/or a device using the second program code. Additionally, or alternatively, test automation platform 210 may provide the second program code to another device to permit the other device to test a software program. This improves testing of a software program by enabling test automation platform 210 to manage testing across multiple devices.

In some implementations, when test automation platform 210 identifies multiple portions of second program code, test automation platform 210 may perform an action related to the multiple portions of second program code. For example, test automation platform 210 may provide information for display indicating that multiple portions are identified (e.g., to permit a user of client device 230 to select a portion for test automation platform 210 to use). Additionally, or alternatively, test automation platform 210 may select a portion by default, at random, based on a previous selection (e.g., determined through use of pattern recognition techniques or machine learning), and/or the like. In this way, test automation platform 210 may dynamically perform an action when the first program code in a first programming language maps to multiple portions of second program code in a second programming language.

In some implementations, test automation platform 210 may provide information for display (e.g., via a display of client device 230) that indicates whether a particular portion of program code satisfies a set of rules. Additionally, or alternatively, test automation platform 210 may provide information for display that identifies a particular portion of program code that does not satisfy a set of rules. This increases an efficiency of writing program code by enabling a tester to quickly and efficiently identify a portion of program code that does not satisfy a set of rules.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
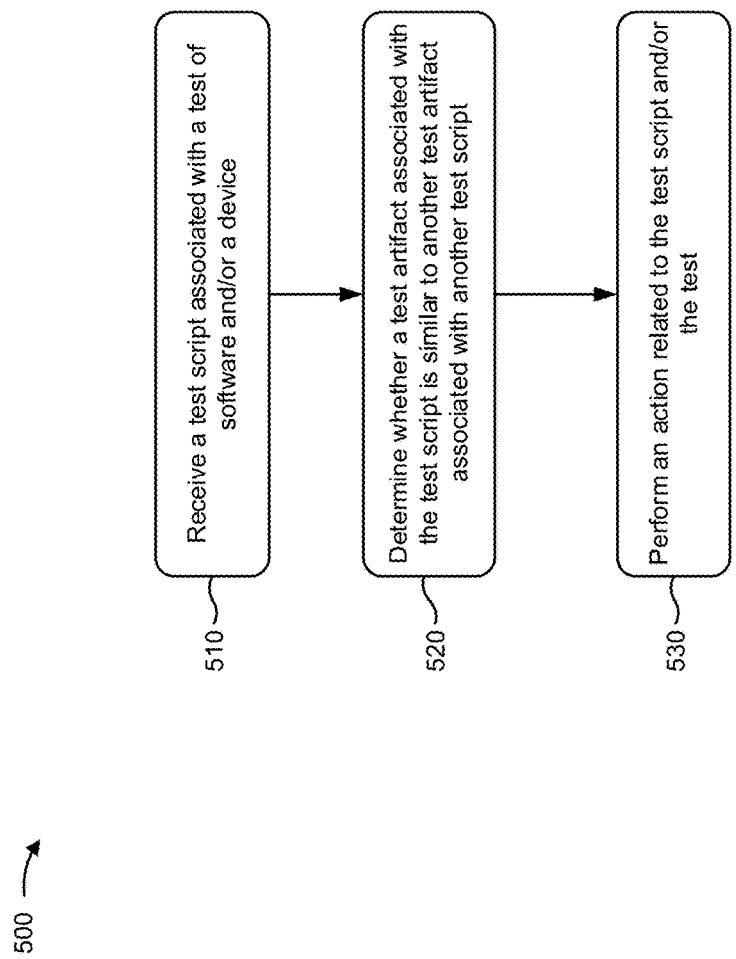
FIG. 5 is a flow chart of an example process for identifying test scripts that are associated with similar test artifacts.

FIG. 5 is a flow chart of an example process 500 for identifying test scripts that are associated with similar test artifacts. In some implementations, one or more process blocks of FIG. 5 may be performed by test automation platform 210. In some implementations, one or more process blocks of FIG. 5 may be performed by another device or a group of devices separate from or including test automation platform 210, such as client device 230.

As shown in FIG. 5, process 500 may include receiving a test script associated with a test of software and/or a device (block 510). For example, test automation platform 210 may receive a test script. A test script may include a set of instructions to be performed to test functioning of software, a device, and/or the like.

In some implementations, test automation platform 210 may further receive a test scenario (e.g., a description of what is being tested, such as "verify login functionality"), a test condition (e.g., a description of particular functionality being tested, such as "verify successful login with valid credentials," "verify unsuccessful login with invalid credentials," or "verify forgot password workflow"), and/or a test artifact (e.g., a set of test scenarios, test conditions, and/or test scripts). Additionally, or alternatively, a test artifact may include documentation related to a use case, various types of diagrams (e.g., class diagrams or Unified Modeling Language (UML) models), a requirements and/or design document, and/or the like.

In some implementations, test automation platform 210 may receive a test script in a manner similar to that described above with respect to first program code (e.g., by a user of client device 230 inputting the test script). In some implementations, the test script may be written using program code. In some implementations, test automation platform 210 may further receive text, such as natural language text that describes a test script, as part of the test script, text in a document (e.g., a requirements document, etc.), and/or the like.

In some implementations, similar to that described above, test automation platform 210 may receive thousands, millions, or billions of test scripts and/or lines of text. In some implementations, test automation platform 210 may process the test script and/or text using natural language processing, text analysis, computational linguistics, machine learning, and/or artificial intelligence to parse the test script and/or text and identify a particular term, tag, and/or phrase included in the test script and/or text.

In some implementations, when test automation platform 210 processes the test script and/or the text, test automation platform 210 may generate a set of words (e.g., a bag-of-words) for the test script and/or text that includes terms, tags, and/or phrases of the test script and/or text. Additionally, or alternatively, test automation platform 210 may remove stop words, identify root words of other words (e.g., identify "process" as a root word of "processing," "processes," etc.), replace particular words with known synonyms, and/or the like. This permits efficient use of terms, tags, and/or phrases of the test script and/or the text, thereby conserving processing resources.

In this way, test automation platform 210 may receive a test script associated with a test of software and/or a device.

As further shown in FIG. 5, process 500 may include determining whether a test artifact associated with the test script is similar to another test artifact associated with another test script (block 520). For example, test automation platform 210 may determine whether a test artifact associated with the test script is similar to another test artifact for another test.

In some implementations, test automation platform 210 may determine whether a test artifact associated with the received test script is the same as another test artifact associated with another test script. For example, test automation platform 210 may compare information identifying a test artifact associated with a first test script and information identifying another test artifact and may determine that the test artifacts are the same when the comparison indicates a match (e.g., indicating that the test artifacts are the same). In this way, test automation platform 210 may automatically identify whether two or more test artifacts are the same.

In some implementations, test automation platform 210 may identify another test script when test automation platform 210 determines that a test script is associated with the same test artifact as the other test script. For example, test automation platform 210 may identify the other test script using a data structure that includes information identifying test artifacts and associated test scripts. In some implementations, test automation platform 210 may select the other test script to use (e.g., in combination with the received test script) and/or may provide information for display identifying the other test script, such as to permit a user of client device 230 to select the other test script for use. In this way, test automation platform 210 may identify another test script based on being associated with the same test artifact as the received test script, thereby increasing an efficiency of identifying test scripts that could potentially be used in combination.

In some implementations, test automation platform 210 may determine whether a first test artifact is similar to a second test artifact (e.g., rather than determining whether the first and second test artifacts are the same). For example, test automation platform 210 may determine whether a test script and/or text associated with the first test artifact is similar to a test script and/or text associated with a second test artifact.

In some implementations, test automation platform 210 may process a test script and/or text (e.g., to determine whether the test artifacts are similar). For example, test automation platform 210 may process a test script and/or text associated with a test artifact (e.g., to determine whether the test artifact is similar to another test artifact). In some implementations, test automation platform 210 may process the test script and/or text using a technique, as described below.

In some implementations, test automation platform 210 may determine a vector for a test artifact. For example, test automation platform 210 may determine a vector for the first test artifact using a term and/or a tag included in a test script and/or text related to the first test artifact. In some implementations, test automation platform 210 may determine a vector for the first test artifact and another vector for the second test artifact. This permits easy comparison of sets of terms and/or tags associated with different test artifacts, thereby conserving processing resources.

In some implementations, test automation platform 210 may determine a vector using a technique. For example, test automation platform 210 may determine a vector using a term frequency and inverse document frequency (tf-idf) technique that generates a vector for a set of terms and/or tags. Continuing with the previous example, test automation platform 210 may determine the vector by determining a score for various terms, phrases, operators, and/or the like included in a test script and/or text associated with the test artifact. For example, when determining the score, test automation platform 210 may use a data structure that includes various terms, phrases, operators, and/or the like and corresponding scores. In some implementations, test automation platform 210 may use the scores to generate a vector. In some implementations, when generating the vector using the scores, test automation platform 210 may sum the scores (e.g., for terms, phrases, etc. of a test artifact or test script), multiply the scores, sum some scores and subtract others, and/or the like to generate the vector.

In some implementations, when determining whether two or more test artifacts are similar, test automation platform 210 may determine a similarity between two vectors. In some implementations, test automation platform 210 may determine the similarity using a technique. For example, test automation platform 210 may determine a similarity between a vector for the first test artifact and another vector for a second test artifact using a cosine similarity technique that generates a score indicating a similarity between the vector for the first test artifact and the vector for the second test artifact. Continuing with the previous example, when using the cosine similarity technique, test automation platform 210 may compare scores for various vectors and/or scores for terms, phrases, and/or operators included in a test script and/or text of test artifacts to determine whether the test artifacts are similar.

In some implementations, test automation platform 210 may determine whether two test artifacts are similar based on a result of determining the similarity. For example, test automation platform 210 may determine whether two test artifacts are similar based on a score generated by the cosine similarity technique satisfying a threshold. In this way, test automation platform 210 may quickly and efficiently determine whether two or more test artifacts are similar, thereby conserving processing resources and/or increasing an efficiency of comparing test artifacts.

In this way, test automation platform 210 may determine whether a test artifact associated with a test script is similar to another test artifact associated with another test script for another test.

As further shown in FIG. 5, process 500 may include performing an action related to the test script and/or the test (block 530). For example, test automation platform 210 may perform an action related to the test script and/or the test. In some implementations, test automation platform 210 may perform a test of software and/or a device using the test script. For example, test automation platform 210 may perform test steps of a test script to test software and/or a device. Additionally, or alternatively, test automation platform 210 may provide the test script to another device to permit the other device to test software. This improves testing of a software program by enabling test automation platform 210 to manage testing across multiple devices.

In some implementations, test automation platform 210 may select a test script associated with a test artifact based on determining that the test artifact and another test artifact are the same or similar. In some implementations, test automation platform 210 may select the test script randomly, based on a prior user selection (e.g., using machine learning or artificial intelligence), based on a test script having similar test steps as a test script associated with the other test artifact, as determined in a manner similar to that described above with respect to test artifacts, and/or the like. In this case, test automation platform 210 may provide information for display that identifies a test artifact and/or test scripts associated with the test artifact, such as to permit a user of client device 230 to select a test script associated with the test artifact.

In this way, test automation platform 210 may identify test scripts associated with the same or similar test artifacts. This permits re-use of test scripts, thereby conserving processing and/or memory resources by reducing or eliminating creation and/or storage of redundant test scripts.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
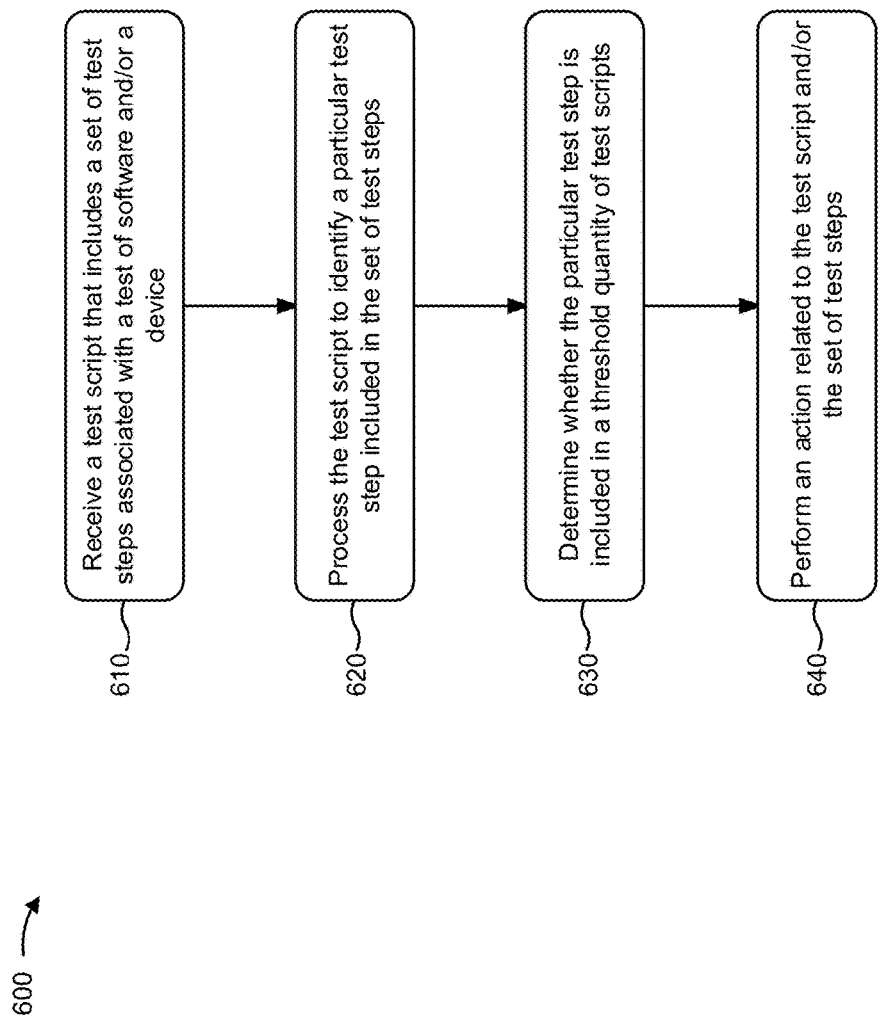
FIG. 6 is a flow chart of an example process for identifying test steps of a test script that can be combined into another test script.

FIG. 6 is a flow chart of an example process 600 for identifying test steps of a test script that can be combined into another test script. In some implementations, one or more process blocks of FIG. 6 may be performed by test automation platform 210. In some implementations, one or more process blocks of FIG. 6 may be performed by another device or a group of devices separate from or including test automation platform 210, such as client device 230.

As shown in FIG. 6, process 600 may include receiving a test script that includes a set of test steps associated with a test of software and/or a device (block 610). For example, test automation platform 210 may receive a test script that includes a set of test steps associated with a test of software and/or a device. In some implementations, test automation platform 210 may receive the test script in a manner similar to that described above with respect to program code. In some implementations, a set of test steps may include a set of instructions that cause software and/or a device to perform an action. The set of test steps may be defined using program code, written in text, and/or the like.

In this way, test automation platform 210 may receive a test script that includes a set of test steps associated with a test of software and/or a device.

As further shown in FIG. 6, process 600 may include processing the test script to identify a particular test step included in the set of test steps (block 620). For example, test automation platform 210 may process the test script to identify a particular test step included in the set of test steps.

In some implementations, test automation platform 210 may process the test script to parse the test script. For example, test automation platform 210 may parse program code and/or text of a test script to identify various test steps included in the set of test steps. In some implementations, test automation platform 210 may process the test script to identify a term that identifies a test step. For example, test automation platform 210 may identify, as an independent test step, a clause or phrase that includes or begins with the program code and/or text And I set, And I wait, And I click, or And I select.

Additionally, or alternatively, test automation platform 210 may process the test script to identify a character that identifies a test step. For example, test automation platform 210 may identify, as an independent test step, a clause or phrase that ends with a; (i.e., a semi-colon), is encompassed by { }, or contains one or more other special characters associated with a test step by known practices or conventions. In this way, test automation platform 210 may quickly and efficiently identify a test step of a test script. In addition, this conserves memory resources by reducing or eliminating the need for test automation platform 210 to store information identifying the test steps of a test script or to receive information that identifies the test steps prior to processing the test script.

In some implementations, test automation platform 210 may identify a particular test step of the set of test steps. For example, test automation platform 210 may identify a first test step, a second test step, etc. of a test script based on processing the test script (e.g., based on identifying independent test steps included in the test script). In this way, test automation platform 210 may receive and process a test script.

As further shown in FIG. 6, process 600 may include determining whether the particular test step is included in a threshold quantity of test scripts (block 630). For example, test automation platform 210 may determine whether the particular test step is included in a threshold quantity of other test scripts.

In some implementations, test automation platform 210 may identify a maximal substring of a test step. For example, test automation platform 210 may identify a maximal substring of a string of characters of a test step that is included in more than one test script. As another example, test automation platform 210 may identify a maximal substring of a logical block (e.g., an "and" logical block, an "or" logical block, or another set of test steps that perform an action) included in more than one test script. In some implementations, a maximal substring may include the longest string, or strings, that is a substring of, or is common to, two or more strings. In some implementations, test automation platform 210 may identify the maximal substring of a test step by identifying various length strings of program code and/or text of a test step.

In some implementations, when identifying a maximal substring, test automation platform 210 may generate a suffix tree for strings of program code and/or text of a test step. Additionally, or alternatively, test automation platform 210 may parse program code and/or text of multiple test steps into various strings of characters with different lengths and compare the various strings. In some implementations, test automation platform 210 may identify the longest string of characters, or a string of characters with a threshold quantity of characters, that is common to the multiple test steps. In this way, test automation platform 210 may identify a maximal substring of a test step.

In some implementations, test automation platform 210 may determine whether a maximal substring of a test step is included in a threshold quantity of test scripts. For example, test automation platform 210 may compare the maximal substring to program code and/or text of test steps for other test scripts and determine whether the comparison indicates a match. In some implementations, test automation platform 210 may determine a quantity of times the comparison indicates a match and may determine whether the quantity satisfies a threshold. In this way, test automation platform 210 may identify a set of test steps included in various test scripts that could potentially be combined into a separate, combined test script.

This conserves memory resources by storing a separate, combined test script that includes frequently used test steps, rather than storing the same frequently used test steps multiple times. In addition, this improves creation of test scripts by reducing or eliminating redundant creation of a test step for various test scripts.

In this way, test automation platform 210 may determine whether a particular test step is included in a threshold quantity of test scripts.

As further shown in FIG. 6, process 600 may include performing an action related to the test script and/or the set of test steps (block 640). For example, test automation platform 210 may perform an action related to the test script and/or the set of test steps. In some implementations, test automation platform 210 may perform a test of software and/or a device. For example, test automation platform 210 may perform test steps of a test script to test software and/or a device. Additionally, or alternatively, test automation platform 210 may provide a test script to another device to permit the other device to test software and/or a device. This improves testing of a software program by enabling test automation platform 210 to manage testing across multiple devices.

In some implementations, test automation platform 210 may provide, for display, information identifying a set of test steps and/or test scripts in which a maximal substring is included (e.g., via a display of client device 230). Additionally, or alternatively, test automation platform 210 may send a message to client device 230 to notify a developer that a maximal substring of a test script is included in a threshold quantity of other test steps or test scripts. Additionally, or alternatively, test automation platform 210 may generate a report that includes information identifying a set of test steps in which a maximal substring is included and information indicating a potential quantity of lines of program code and/or memory resources that could be conserved by combining the set of test steps into a separate, combined test script.

In this way, test automation platform 210 may perform an action related to a test step and/or a test script.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
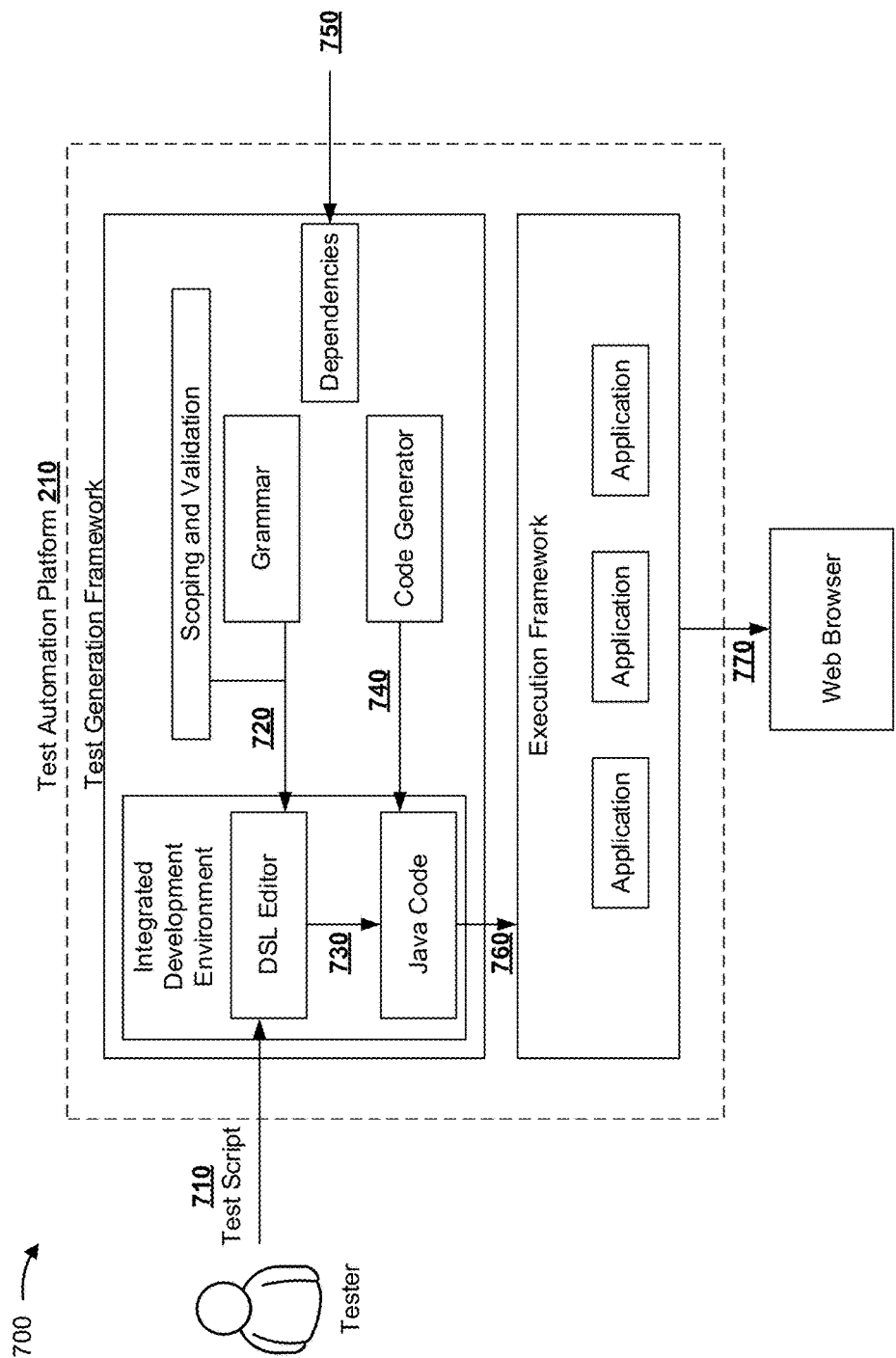
FIG. 7 is a diagram of an example implementation described herein.

FIG. 7 is a diagram of an example implementation 700 described herein. As shown in FIG. 7, example implementation 700 may include test automation platform 210 and a web browser. As further shown in FIG. 7, test automation platform 210 may include a test generation framework that includes an integrated development environment, an execution framework, and various applications and/or modules.

As shown by reference number 710, a tester may provide a test script to test automation platform 210. In some implementations, the tester may input the test script in a domain-specific language (DSL), such as a constrained English-like language like Gherkin, using a DSL editor of an integrated development environment. Additionally, or alternatively, the tester may use the DSL editor to upload a program file that includes the test script.

As shown by reference number 720, test automation platform 210 may enforce one or more rules of the DSL using a module and/or an application. In some implementations, test automation platform 210 may determine whether the DSL provided by the tester satisfies a grammar rule using a grammar module that specifies the manner in which a test step can be written. Additionally, or alternatively, the grammar module may identify tester inputs in the test script and the actions to be performed on the inputs (e.g., which may be provided to the code generator module).

In some implementations, test automation platform 210 may use a scoping and validation module to identify prompts to provide for display to the tester based on the received test script (e.g., scoping) and to determine whether the test script satisfies other rules, such as data type matching rules or unique identifier rules (e.g., validation). In this way, test automation platform 210 improves automatic testing by reducing or eliminating use of erroneous program code. This conserves processing resources that would otherwise be used to compile and/or execute erroneous program code.

As shown by reference numbers 730 and 740, test automation platform 210 may generate Java code based on the DSL program code of the received test script. In some implementations, test automation platform 210 may generate Java code such that a result of executing the Java code, or an action caused by execution of the Java code, is the same as would have occurred with execution of the received test script written in the DSL. Additionally, or alternatively, when a tester makes changes to the test script, the code generator module may automatically generate Java code to record the changes. In this way, test automation platform 210 may receive first program code in a first programming language (e.g., a DSL) and generate second program code in a second programming language (e.g., Java). This improves automatic testing by reducing an amount of technical skill needed by a tester.

As shown by reference number 750, a dependencies module may determine whether dependencies related to the test generation framework are satisfied. For example, test automation platform 210 may use the dependencies module to determine whether software that is needed for other modules to properly run are installed on test automation platform 210 or that test automation platform 210 has accesses to the needed software.

As shown by reference number 760, test automation platform 210 may use one or more applications of an execution framework to execute the generated Java code. For example, test automation platform 210 may use a Selenium application, a TestNG application, a Jenkins application, and/or the like, to execute the generated Java code. As shown by reference number 770, when executed, the Java code may cause test automation platform 210 to perform an action using a web browser. For example, test automation platform 210 may use the web browser to test functionality of a web site or web-based system, such as login functionality.

In this way, test automation platform 210 may automatically test software and/or a device.

As indicated above, FIG. 7 is provided merely as an example. Other examples are possible and may differ from what was described with regard to FIG. 7.

Implementations described herein provide a test automation platform that may receive a test script in a first programming language and generate and/or identify program code in a second programming language (e.g., to be used to execute the test script or a portion of the test script). Additionally, or alternatively, the test automation platform may identify a test script that is similar to a received test script. Additionally, or alternatively, the test automation platform may identify a step of various test scripts that may be combined into a single test script.

In this way, the test automation platform reduces the amount of technical skill needed to create a test script by reducing a quantity of programming languages that a tester may have to know. Additionally, or alternatively, the test automation platform reduces repetitious creation of test scripts, thereby increasing the efficiency of creating test scripts. Additionally, or alternatively, the test automation platform conserves processing resources by reducing an amount of program code that the test automation platform and/or another device compiles/executes. Additionally, or alternatively, the test automation platform conserves memory resources by reducing a quantity of lines of program code that the test automation platform and/or another device stores. Additionally, or alternatively, the test automation platform may reduce an amount of program code required to be written by a tester.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
  receive information identifying a set of steps to perform,
    the set of steps being related to a test of a program,
    one or more steps, of the set of steps, being written in a first programming language;
  determine whether the set of steps is associated with a first artifact that is similar to a second artifact associated with another set of steps based on the information identifying the set of steps,
    the first artifact identifying information related to the test of the program and the second artifact identifying information related to another test of another program;
  determine whether two or more steps, of the set of steps, can be combined into a combined set of steps based on determining whether the set of steps is associated with the first artifact that is similar to the second artifact;

identify program code written in a second programming language based on determining whether the two or more steps, of the set of steps, can be combined into the combined set of steps,
the second programming language being different from the first programming language; and
perform an action related to the test of the program based on identifying the program code.

2. The device of claim 1, where the one or more processors are further to:
determine whether the first artifact and the second artifact are the same based on the information related to the test identified by the first artifact and the information related to the other test identified by the second artifact;
identify the other set of steps based on determining whether the first artifact and the second artifact are the same,
the other set of steps being associated with the second artifact; and
where the one or more processors, when performing the action, are to:
perform the action based on identifying the other set of steps.

3. The device of claim 1, where the one or more processors are further to:
identify a term associated with the first artifact and another term associated with the second artifact based on the information related to the test identified by the first artifact and the information related to the other test identified by the second artifact;
determine whether the term and the other term are similar based on identifying the term and the other term; and
determine whether the first artifact and the second artifact are similar based on determining whether the term and the other term are similar.

4. The device of claim 1, where the one or more processors are further to:
identify a maximal substring of the two or more steps based on the information identifying the set of steps; and
where the one or more processors, when determining whether the two or more steps of the set of steps can be combined into the combined set of steps, are to:
determine whether the two or more steps of the set of steps can be combined into the combined set of steps based on identifying the maximal substring of the two or more steps.

5. The device of claim 1, where the one or more processors are further to:
process the two or more steps to identify one or more logical blocks of the set of steps based on the information identifying the set of steps; and
where the one or more processors, when determining whether the two or more steps of the set of steps can be combined into the combined set of steps, are to:
determine whether the two or more steps of the set of steps can be combined into the combined set of steps based on identifying the one or more logical blocks.

6. The device of claim 1, where the one or more processors are further to:
receive information identifying a browser to use during the test of the program; and
where the one or more processors, when identifying the program code, are to:
identify the program code based on the information identifying the browser.

7. The device of claim 1, where the one or more processors, when performing the action, are to:
select the two or more steps based on determining that the two or more steps can be combined into the combined set of steps; and
store the two or more steps as the combined set of steps based on selecting the two or more steps.

8. A method, comprising:
receiving, by a device, information identifying a first set of instructions,
the first set of instructions identifying one or more actions to perform to test a first program;
identifying, by the device, a second set of instructions that can be used in association with the first set of instructions based on information related to a first test of the first program and information related to a second test of a second program,
the second set of instructions being related to testing the second program,
the first test being similar to the second test;
identifying, by the device, multiple steps, of the first set of instructions, that can be combined to form a third set of instructions based on identifying the second set of instructions that can be used in association with the first set of instructions,
the third set of instructions to be used to test the first program or to test a third program;
generating, by the device, program code in a first programming language to perform the one or more actions based on identifying the multiple steps of the first set of instructions that can be combined to form the third set of instructions,
the first programming language being different than a second programming language used to write the first set of instructions; and
performing, by the device, the one or more actions based on generating the program code.

9. The method of claim 8, further comprising:
determining a first score for the first test based on the information related to the first test and a second score for the second test based on the information related to the second test;
performing a comparison of the first score and the second score based on determining the first score and the second score;
determining that the first score and the second score are similar based on a result of the comparison; and
where identifying the second set of instructions comprises:
identifying the second set of instructions based on determining that the first score and the second score are similar.

10. The method of claim 9, further comprising:
determining a cosine similarity of the first score and the second score based on determining the first score and the second score; and
where determining that the first score and the second score are similar comprises:
determining that the first score and the second score are similar based on determining the cosine similarity of the first score and the second score.

11. The method of claim 8, further comprising:
determining a measure of similarity between the information related to the first test and the information related to the second test based on receiving the information identifying the first set of instructions;

determining whether the measure of similarity satisfies a threshold based on determining the measure of similarity; and where identifying the second set of instructions comprises:

identifying the second set of instructions based on determining whether the measure of similarity satisfies the threshold.

12. The method of claim 8, further comprising:

determining a frequency of use of the multiple steps based on the information identifying the first set of instructions;

determining whether the frequency of use satisfies a threshold based on determining the frequency of use; and where identifying the multiple steps comprises:

identifying the multiple steps based on determining whether the frequency of use satisfies the threshold.

13. The method of claim 8, further comprising:

processing the first set of instructions to identify one or more steps of the first set of instructions based on receiving the information identifying the first set of instructions, the one or more steps being identified by a particular term or character; and where identifying the multiple steps comprises:

identifying the multiple steps based on identifying the one or more steps using the particular term or character.

14. The method of claim 8, further comprising:

receiving a set of rules associated with the first set of instructions, the first programming language, or the second programming language;

determining whether the first set of instructions satisfies the set of rules based on receiving the set of rules; and where generating the program code comprises:

generating the program code based on determining whether the first set of instructions satisfies the set of rules.

15. A non-transitory computer-readable medium storing instructions, the instructions comprising:

one or more instructions that, when executed by one or more processors, cause the one or more processors to:

receive information identifying a test script, the test script including one or more steps related to a test of a program, the one or more steps being written in a first programming language;

determine whether the test script and another test script are associated with similar artifacts based on receiving the information identifying the test script, the similar artifacts including information associated with different tests of different programs;

determine whether a plurality of steps, of the one or more steps, can be combined into a set of steps based on determining whether the test script and the other test script are associated with the similar artifacts;

identify program code written in a second programming language based on determining whether the plurality of steps of the one or more steps can be combined into the set of steps, the first programming language and the second programming language being different; and perform an action related to the test script based on identifying the program code.

16. The non-transitory computer-readable medium of claim 15, where the one or more instructions, when executed by the one or more processors, further cause the one or more processors to:

process an artifact and another artifact to identify a plurality of terms associated with the artifact and another plurality of terms associated with the other artifact based on receiving the information identifying the test script, the test script being associated with the artifact, the other test script being associated with the other artifact;

determine a vector for the artifact based on the plurality of terms and another vector for the other artifact based on the other plurality of terms based on processing the artifact and the other artifact;

determine a cosine similarity between the vector and the other vector based on determining the vector and the other vector; and where the one or more instructions, that cause the one or more processors to determine whether the test script and the other test script are associated with the similar artifacts, cause the one or more processors to:

determine whether the test script and the other test script are associated with the similar artifacts based on determining the cosine similarity.

17. The non-transitory computer-readable medium of claim 16, where the one or more instructions, that cause the one or more processors to determine the vector and the other vector, further cause the one or more processors to:

determine the vector or the other vector using a term-frequency and inverse document frequency (tf-idf) technique.

18. The non-transitory computer-readable medium of claim 15, where the one or more instructions, when executed by the one or more processors, further cause the one or more processors to:

process the test script to identify at least one logical block of the test script based on receiving the information identifying the test script, the at least one logical block including at least one step of the one or more steps; and where the one or more instructions, that cause the one or more processors to determine whether the plurality of steps of the one or more steps can be combined into the set of steps, cause the one or more processors to:

determine whether the plurality of steps of the one or more steps can be combined into the set of steps based on identifying the at least one logical block.

19. The non-transitory computer-readable medium of claim 18, where the one or more instructions, when executed by the one or more processors, further cause the one or more processors to:

process the at least one logical block to identify a maximal substring of the at least one logical block based on identifying the at least one logical block; and where the one or more instructions, that cause the one or more processors to determine whether the plurality of steps of the one or more steps can be combined into the set of steps, cause the one or more processors to:

determine whether the plurality of steps of the one or more steps can be combined into the set of steps based on identifying the maximal substring.

20. The non-transitory computer-readable medium of claim 19, where the one or more instructions, when executed by the one or more processors, further cause the one or more processors to:

determine whether the maximal sub string is included in a threshold quantity of test scripts based on identifying the maximal substring; and where the one or more instructions, that cause the one or more processors to determine whether the plurality of steps of the one or more steps can be combined into the set of steps, cause the one or more processors to:
determine whether the plurality of steps of the one or more steps can be combined into the set of steps based on determining whether the maximal sub string is included in the threshold quantity of test scripts.

\* \* \* \* \*